Patented May 19, 1953

2,639,302

UNITED STATES PATENT OFFICE 2,639,302

PREPARATION OF CHLOROBROMODI-FLUOROMETHANE

Robert P. Ruh and Ralph A. Davis, Midland, Mich., assignors to The Dow Chemical Company, Midland, Mich., a corporation of Delaware No Drawing. Continuation of application Serial No. 125,163, November 2, 1949. This application January 11, 1952, Serial No. 266,096

2 Claims. (Cl. 260—653)

This invention relates to the preparation of chlorobromodifluoromethane.

This application is a continuation of our application Serial No. 125,163, filed November 2, 1949.

Chlorobromodifluoromethane, believed to be a new compound, has been prepared by a novel reaction which is a vapor phase halogenation, namely, a vapor phase chlorination of bromodifluoromethane. (Chlorobromodifluoromethane has also been prepared by fluorinating chlorotribromomethane in the presence of antimony trifluoride and bromine.) The novel vapor phase halogenation has not, so far as is known, heretofore been suggested; in fact the most closely related compound (fluoroform) with which chlorination and bromination studies have been conducted is said by Henne (J. Am. Chem. Soc. 59, 1201, (1937)) to undergo chlorination only with extreme difficulty, and to undergo bromination not at all. In view of Henne's statements it would not have been anticipated that there would be a method by which bromodifluoromethane could be chlorinated readily.

Chlorobromodifluoromethane is an unexpectedly valuable compound; its boiling point (—4° C.) is intermediate between the boiling points of previously known fluoromethanes, and it can be readily produced from relatively inexpensive starting materials. The relationship of the boiling point of chlorobromodifluoromethane to the boiling points of previously known fluoromethanes is seen in the table below:

Table

| Compound | Normal Boiling Point, ° C. |
| --- | --- |
| Chlorodifluoromethane | −40.8 |
| Dichlorodifluoromethane | −28.0 |
| Chlorobromodifluoromethane | −4 |
| Trichlorofluoromethane | +24.1 |

From the table it is apparent that this new compound fills a gap that heretofore existed, in that its normal boiling point is intermediate between the boiling point of dichlorodifluoromethane and the boiling point of trichlorofluoromethane. A boiling point of about —4° C. is optimum for a refrigerant to be used in air conditioning applications because a slight pressure above atmospheric is required with such a refrigerant to give the desired coil temperature (35° F. to 50° F.). Other known compounds having boiling points about the same as that of chlorobromodifluoromethane are substantially less desirable than is the compound of the invention because they are either not suitable for use as refrigerants or are sufficiently complex in molecular structure that they are substantially more expensive to produce.

The principal object of the present invention is the preparation of chlorobromodifluoromethane. More specific objects and advantages are apparent from the specification, which illustrates and discloses, but is not intended to limit the invention.

According to the invention chlorobromodifluoromethane, a new compound, is produced. Chlorobromodifluoromethane results from the vapor phase chlorination of bromodifluoromethane. Molecular chlorine is used as the chlorinating agent, and the chlorination is effected at a temperature between about 20° C. and the pyrolysis temperature under the conditions employed. A contact time not longer than about 75 seconds is used.

As has been indicated, the new compound is produced by means of a vapor phase chlorination (i. e., by reaction between two compounds: $HCBrF_2$ and $Cl_2$; the reaction is conducted at a temperature at which H is replaced by Cl, with consequent formation of HCl). The chlorination proceeds at temperatures as low as about 20° C., and at temperatures up to the pyrolysis temperature. It is usually preferred that the chlorination be conducted at a temperature between about 100° C. and about 400° C. so that the reaction proceeds at a practical rate.

The contact time (i. e., the average time that a unit quantity of gas is in the reaction zone) that is used in carrying out the vapor phase chlorination and the temperature at which the chlorination is conducted are related. In general, if the reaction temperature is lower, the contact time must be higher in order to achieve a given yield of chlorobromodifluoromethane. For example, if the new compound is produced by chlorination carried out at a temperature of about 50° C., it is usually desirable to use a contact time between about 50 seconds and about 60 seconds; if, on the other hand, a reaction temperature of 350° C. is used, a contact time between about 10 seconds and about 20 seconds is usually desired. It is ordinarily preferred to conduct the chlorination at a comparatively high temperature, using a relatively short contact time, because optimum utilization of the equipment is thus accomplished. Accordingly, it is preferred to use contact times of from about 1 second to about 25 seconds; such contact times are practical when the temperature at which the chlorination is conducted is within the preferred range indicated above. Contact times of a fraction of a second are entirely feasible in the practice of the invention and may, in some instances, be particularly advantageous. To produce chlorobromodifluoromethane according to the invention, and using a short reaction time, the reactants can be passed through a reaction zone in which heating may be very rapidly effected (e. g., one in which the available heating surface area is relatively large in comparison with the volume of gas in the reactor). Under such conditions, if the reaction temperature is comparatively high, extremely short contact times are practicable, and are highly advantageous for the reason that the equipment cost of producing chlorobromodifluoromethane is minimized.

It is usually desired that the mol ratio of chlorine to bromodifluoromethane be at least about 0.5:1, although chlorination proceeds in accordance with the invention with merely a trace of chlorine present (e. g., as little as 1 mol per 10 mols of fluoromethane starting material). Ordinarily, there is no reason to use more than about 1.5 mols of chlorine per mol of bromodifluoromethane, and it is usually preferred to use from about 0.75 to about 1.25 mols of chlorine per mole of the difluorinated starting material.

The reaction of the invention is conducted either batchwise or continuously. If the reaction is conducted batchwise, the starting materials are added to an evacuated flask which is then brought to a temperature at which reaction proceeds and illuminated by a light source. However, it is preferred that the process be conducted continuously, because the reaction is more easily carried out continuously, and because better yields result. The reaction is conducted continuously in any convenient reaction vessel; a tube is ordinarily adequate for the purpose. It is usually desirable that the tube, or other reaction vessel, be packed with a material inert to the reactants and to the chlorobromodifluoromethane in order to increase the effective heat transfer surface.

Although it is not essential, it is usually desired to conduct the reaction so that the gases are subjected to the action of light. Sunlight is effective for this purpose, but an ordinary tungsten light bulb source or ultraviolet light can also be used.

The following example illustrates the new process but is not to be construed as limiting the scope of the invention.

*Example*

The following procedure was used to produce chlorobromodifluoromethane:

A Vycor tube having an internal diameter of 1 inch and an overall length of 32 inches was placed in an open-coil electric furnace. ("Vycor" glass contains from 90 to 96 per cent silica, and is made by the Corning Glass Works). The internal length of the furnace was 24 inches, so that a 24 inch section of the Vycor tube was heated in the furnace; the furnace was heated to maintain the temperature of the heated portion of the tube at about 200° C. (as estimated by determining the temperature of the outside of the tube with a Chromel-Alumel thermocouple).

The chlorination was carried out by passing a mixture of bromodifluoromethane (30.5 grams) and chlorine (28 grams) through the Vycor tube, which was maintained at a temperature of about 200° C. The mixture of gases was passed through the tube at such a rate that the contact time was about 70 seconds. The effluent products were passed through water scrubbers, dried over anhydrous calcium sulfate and condensed in receivers cooled by an acetone-Dry Ice mixture. Fractionation of the collected product yielded 13.1 grams of bromodifluoromethane, and 17.6 grams of chlorobromodifluoromethane. The freezing point of chlorobromodifluoromethane was determined to be −159.1° C., and the boiling point at an absolute pressure of 760 millimeters of mercury was found to be −3.97° C. When condensed chlorobromodifluoromethane is a water-clear liquid; in the vapor phase it is a colorless gas.

We claim:

1. A method of producing chlorobromodifluoromethane that comprises passing a vapor mixture of bromodifluoromethane and chlorine through a zone heated to a temperature at which hydrogen of the bromodifluoromethane is replaced by chlorine with consequent formation of hydrogen chloride, using a contact time not longer than about 75 seconds.

2. A method as claimed in claim 1 in which the chlorination is effected at a temperature between about 100° C. and about 400° C.

ROBERT P. RUH.
RALPH A. DAVIS.

No references cited.